United States Patent [19]

Salvail

[11] Patent Number: 5,515,979
[45] Date of Patent: May 14, 1996

[54] SIMPLIFIED JEWEL CASE MANAGEMENT AND OPENING FOR COMPACT DISK STORAGE SYSTEMS

[76] Inventor: Napoleon P. Salvail, 6610 S. Fork, Titusville, Fla. 32780

[21] Appl. No.: 271,003

[22] Filed: Jul. 5, 1994

[51] Int. Cl.⁶ ...................................................... A47F 5/00
[52] U.S. Cl. .......................... 211/40; 211/41; 206/308.1; 312/9.48
[58] Field of Search .................... 211/40, 41; 312/9.9, 312/9.48, 9.51, 9.47; 206/309, 387

[56] References Cited

U.S. PATENT DOCUMENTS

| | | | |
|---|---|---|---|
| 4,932,522 | 6/1990 | Milovich | 312/9.48 X |
| 5,097,946 | 3/1992 | Emrich | 312/9.48 X |
| 5,180,058 | 1/1993 | Hu | 211/40 X |
| 5,346,074 | 9/1994 | Overholser | 312/9.9 X |
| 5,363,960 | 11/1994 | Ackeret | 312/9.48 X |
| 5,370,244 | 12/1994 | Peng | 211/41 X |
| 5,393,135 | 2/1995 | Tisbo et al. | 312/9.48 |

*Primary Examiner*—Robert W. Gibson, Jr.

[57] ABSTRACT

A lower cost simplified storage system for compact discs or the like arranged in a vertical columns consisting of a series of storage areas defined by projections from the side walls; containing sliding elements with wire linkages attaching to the existing CD jewel case providing retention of the jewel case and automatic opening of the jewel case cover when the selected jewel case is withdrawn.

8 Claims, 7 Drawing Sheets

SIMPLIFIED JEWEL CASE MANAGEMENT AND OPENING FOR COMPACT DISK STORAGE SYSTEMS

BACKGROUND—FIELD OF INVENTION

This invention relates to the storage of compact disks, (CD's), compact disk-read only memory (CD-ROM's), or the like utilizing the original jewel box packaging and providing means to retain the packaging and provides automatic opening of the cover when the selected disc and package is withdrawn from the storage system.

BACKGROUND—DESCRIPTION OF PRIOR ART

With the advent of this digital recording medium, users have been faced with a new set of problems in handling the discs. The CD's are not perfect since the quality can still be effected by scratches or dirt on the surface. Because of this, each new disc is provided with durable and attractive three piece molded crystal jewel case. The industry has adopted this standard, and with few exceptions all discs are packaged in a generic crystal jewel case with hinged cover.

Since storage and handling of these new digital discs posed similar problems as that previously experienced with phonograph records, a variety of systems to store the disc and case have been developed and marketed. With few exceptions the storage systems available provide horizontal slots for the case and disc combination to be stored. After selecting the music, the case and disc are removed from the rack or stack. The jewel case must then be opened and the CD removed and placed into the player. The empty case must then be picked up, the lid closed, and then returned to its storage position. After listening to the CD these steps have to be repeated. As simple as each of these steps are, the number of operations become annoying and tedious for the user. Keeping track of the case can be a problem since they must be individually handled each time that the disc is selected for play. The jewel cases for compact discs are also sometimes finicky and require a special technique to open easily.

As might be expected the number of steps required to handle a single disc creates a number of additional problems. It is quite easy to lay the empty case next to the player instead of returning it to its respective slot. Since a large number of the compact disc players offer multiple disc handling with five being typical, there may be several empty or previously played cases laying around the player. Making sure that the case or disc/case combination get back in the right position requires care. Just making sure that the correct disc is in the correct case is a source of error. In short there is much about the typical rack systems currently available that is far from ideal.

Similar problems are also experienced with the Compact Disks utilized to store digital computer information (CD ROM) for use with large data files or interactive games.

Numerous patents describe the advantages of providing a drawer to hold the CD or retain the original crystal case. For example U.S. Pat. No. 4,702,533 (Seifert) discloses the advantages of a drawer which utilizes the bottom half of the original packaging. In U.S. Pat. No. 4,664,261 (Frodelius) the original packaging is retained with a clamping assembly and made a part of the drawer unit. When selected the CD and case is withdrawn and the case lid manually opened for removal or replacement of the CD. A locking mechanism is shown to keep the lid from closing accidentally. U.S. Pat. No. 4,932,522 (Milovich) goes a step farther in providing a drawer and clamshell assembly in which the original packaging is inserted. In this case the lid is opened automatically when the selected drawer is withdrawn. In U.S. Pat. No. 5,097,946 (Emrich) the automatic system is simplified by use of a guide spring that uses a track to open the original packaging lid automatically when the drawer is withdrawn. The spring assembly is incorporated into a simplified framework that is designed to support the existing crystal case. The installation of the spring pin/opening element will be difficult for the consumer to put in place when installing the crystal case in the storage system. The relative proximity of the adjacent shelves makes relocating the jewel case difficult. All three concepts have limited flexibility and their costs have severely limited their market acceptance in a marketplace totally dominated by the concept of shelves and the cost per storage position.

SUMMARY DESCRIPTION OF INVENTION OBJECTS AND ADVANTAGES

With the above noted art and other references sited in mind, it is the object of this invention to provide a simpler and dramatically less expensive system to retain and store the CD's in their original jewel box packaging while continuing to offer retention and automatic opening of the jewel case. This invention takes the teachings from the prior art and progresses a step further to create a system that is more flexible yet simpler in its execution and capability to meet the needs of the user. The present invention requires only the addition of two small slider retainers with spring wire linkage clips to hold the jewel box package, and to raise the jewel case cover when the jewel case assembly is fully withdrawn. The sidewall concept required is a slightly modified version of the typical sidewall concepts described in numerous patents and currently offered in the marketplace.

The concept takes advantage of a slot provided at the rear of the jewel case cover to retain literature on the CD contained. Utilizing a clip fabricated from a spring wire the entire jewel case can be connected and attached to the pair of sliders that move in tracks between the separating shelves provided in the sidewall separators. As the user removes the jewel case and slider assembly the jewel case base is allowed to fall downward under the force of gravity and the cover is raised with a cam action that occurs as the jewel case bottom falls downward.

Further objects and advantages of my invention will become apparent from a consideration of the drawings and ensuing description of it.

BRIEF DESCRIPTION OF DRAWINGS

In the drawings, closely related figures have the same number but different alphabetic suffixes.

REFERENCE NUMERALS IN DRAWINGS

| 10 | Jewel Case Assembly | 15 | Jewel Case Bottom |
|---|---|---|---|
| 20 | Jewel Case Cover | 21 | Jewel Case Cover Pivot |
| 22 | Jewel Case Cover Bumper | 23 | Recess For Jewel Case Cover Detent |
| 24 | Jewel Case Cover Detent | 30 | Jewel Case Cover Rear Slot |
| 25 | Compact Disk (CD) | 40 | CD Storage Housing |
| 35 | Separation and Guide Fin | 50 | Guide Rail |
| 45 | Cam Slider Linkage Clip | 60 | Jewel Case Slider Rear Stop |
| 46 | Spring Clip Formed to Engage Jewel Case Cover | 70 | Slider Guide Slot |
| | | 80 | Flattened Segment for Inhibiting Rotation |
| 55 | Cam Slider Assembly | | |
| 61 | Modified Slider Rear Stop | 90 | Final Rotated Slider Orientation |
| 65 | Cam Actuation Stop | 100 | Axis of Spring Linkage Clip |
| 75 | Normal Slider Orientation During Translation | 110 | Cover Rotation Due to Cam Slider Action |
| 85 | Curved Portion for Rotation | 120 | Partial Shelf Support and Guide |
| 95 | Rotation of Base | 130 | Spring Slider Assembly |
| 105 | Angular Rotation of Cam Slider | | |
| 125 | Spring Slider Linkage Clip | | |
| 131 | Spring Slider Guide Grooves | | |
| 135 | Spring Linkage Clip Rear Stop | 140 | Spring Linkage Clip Angular Preload |

DETAILED DESCRIPTION—FIGS. 1 TO 8

Figure 1:
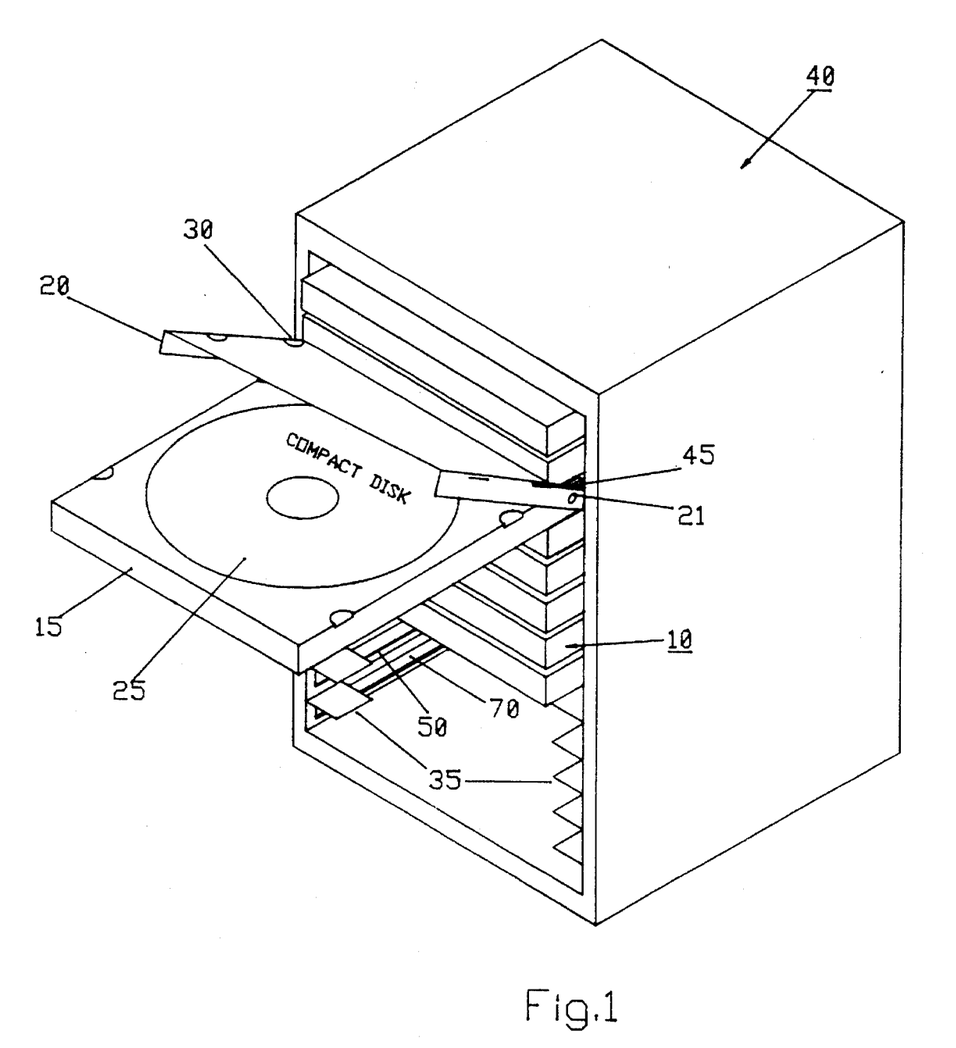
FIG. 1 is an overall isometric view of the storage system with selected compact disc jewel case withdrawn.

FIG. 1 illustrates a typical Compact Disk storage concept using the preferred elements of this invention. The compact disk jewel cases are oriented horizontally to facilitate identification of the contents. A generally rectangular housing 40 encloses the storage system. The side walls of the housing provides a plurality of storage positions consisting of guide slots 70 with upper and lower rails 50 in each side wall and a pair of short projecting separation and guide fins 35 from the forward end of each side wall. The front edges of each of the stored jewel cases 10 project a short distance from the front face to enable ease of access in gripping the jewel cases 10 for removal. One of the jewel cases 10 is shown in the fully withdrawn position with the Compact Disk 25 available for convenient removal or replacement. In the withdrawn position the jewel case bottom 15 rotates downward under the influence of gravity and rests on the upper front edge of the next lower jewel case 10. The linkage clip 45 attached to the jewel case cover 20 through the rear slot 30 raises the jewel case cover 20 contacting the lower front edge of the next higher jewel case 10.

Figure 2:
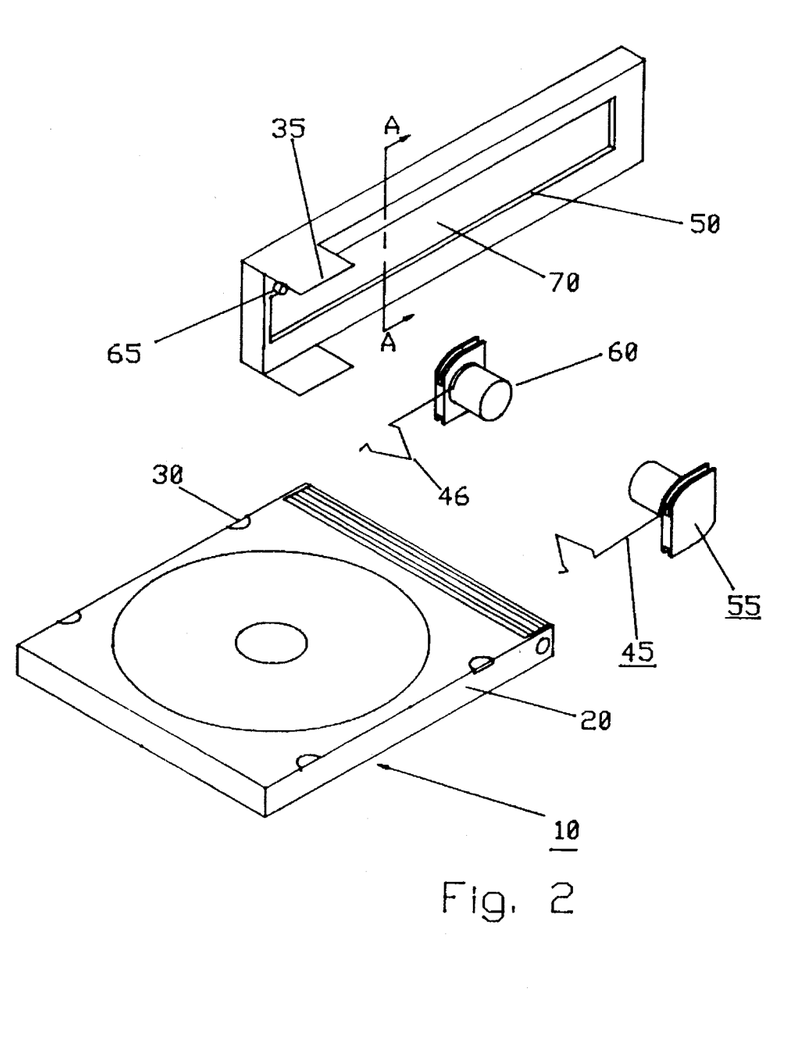
FIG. 2 is an isometric view of the preferred embodiment showing the pair of cam sliders with attached linkage clips and corresponding guide slot in the sidewall unit for engaging and guiding the sliders.
Figure 2A:
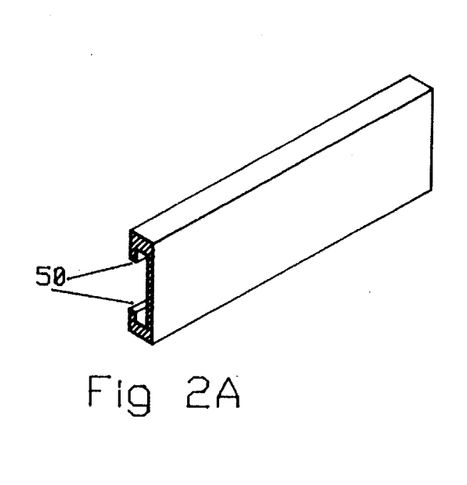
FIG. 2A shows a typical cross section configuration for the sidewall slot guide rails taken at a point just to the rear of the projection that defines the storage positions.

In FIG. 2, all the elements of the preferred embodiment are shown. In order to support and guide the jewel case 10 two cam slider assemblies 55 are shown. The rear of the jewel case 10 rests against the cam slider 55 projections that constitute the jewel case rear stop 60. The forward portion of the linkage clip 45 forms a modified V shape 46 which engages and clips into the existing slot 30 in the jewel case cover 20, providing a secure attachment between the slider assembly 55 and the jewel case 10. As the jewel case 10 is moved the slider 55 and linkage clip 45 guide and retain it. The projection 60 also is configured to hold and retain the cam linkage clip 45 and prevent it from rotating about its longitudinal axis. In addition to guidance of the slider 55 the sidewalls provide separation and guidance 35 at the front entrance of each storage position. In FIG. 2 this is shown in the form of a short section or fin 35 but could take the form of a post. A cam actuation stop 65 is located on the upper front portion of the upper guide rail 50. FIG. 2A shows a section of the sidewall with the slot 70 and guide rail 50 configuration. In additional to the slider 55 and rail 50 concept shown there are several other traditional mechanical concepts that can provide the containment and guiding properties for the slider 55, linkage 45, and jewel case 10 assembly. A channel could also provided the guidance required for an appropriately shaped slider.

Figure 3:
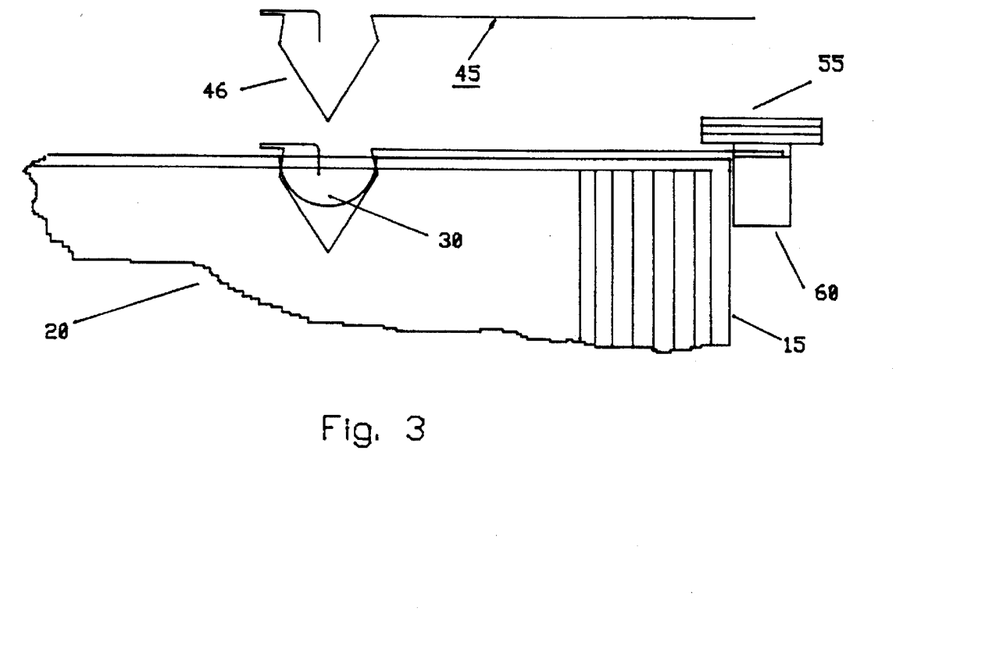
FIG. 3 illustrates a system for clipping the jewel case cover to the cam linkage clip

FIG. 3 illustrates one possible form for the wire linkage 45 providing clipping and retention of the jewel case cover 20. With the forward clip 46 end of the linkage 45 in the jewel case slot 30 the rear corner of the jewel case bottom 15 rests against the slider projection 60. With this arrangement the jewel case 10 assembly is captured during movement in or out of the selected storage position. The wire linkage 45 is sized to support the rear of the jewel case 10 without the need for additional support from the slider 55 projection 60.

Figure 4:
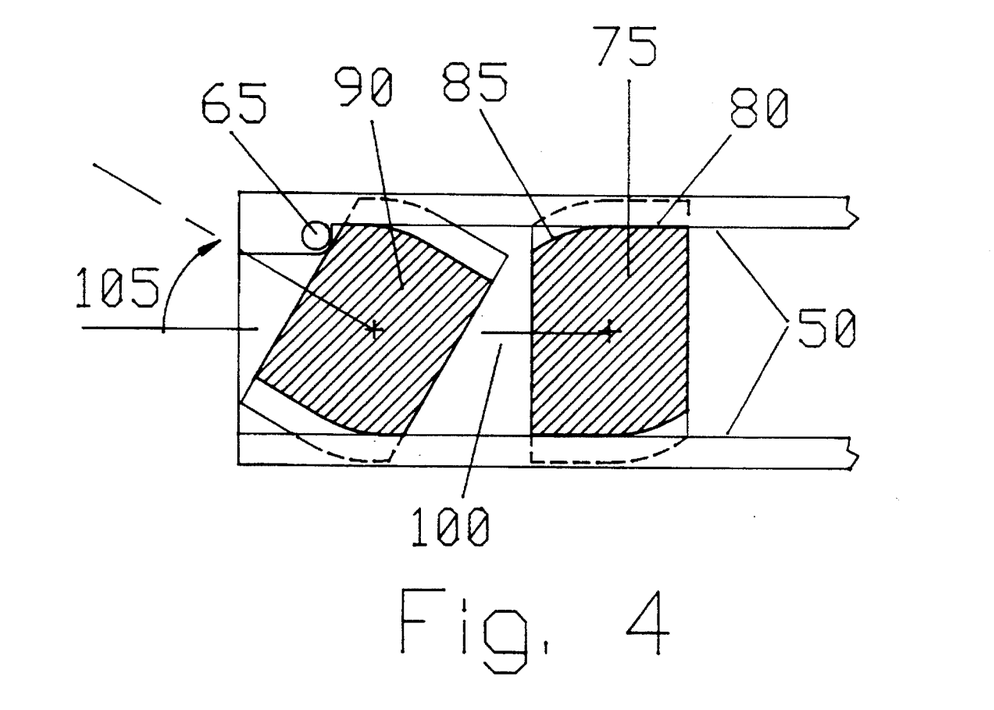
FIG. 4 is a side view of the sidewall guide slot and rails with a section taken through the cam slider units, showing the shape and rotation required for the cam assisted jewel case cover opening system.

FIG. 4 illustrates the action of the cam slider 55 as it is moved from the rear of the guide slot 70 to the front limit after contacting the cam actuation stop 65. The slider 55 is shown in either of two orientations with the fully rotated 90 shown at the limit of forward travel. The normal sliding orientation is shown as orientation 75. The slider 55 has been sectioned to show the interface with the rails 50. For clarity the outer rear edges of the slider 55 are shown. The angular position 105 illustrates the rotation of the linkage clip from the sliding orientation 100 as the axis of the linkage clip is raised to the fully extended final position 105 after contact with the cam actuation stop 65. The horizontal segment 80 with its corresponding opposing element inhibit the rotation of the slider 55 in the counterclockwise direction, while the opposite element 85 retains the proper curvature to permit clockwise rotation when tension is placed on the linkage clip 45 through the connecting axis 100. Inhibiting the counterclockwise rotation of the slider 55 allows the linkage clip 45 to support the rear of the jewel case assembly 10 when it is stored in the housing 40. This eliminates the need for full length separation shelves as opposed to the shortened guide fins 35 required in this concept. The remaining portion of the sidewall consists of only guide slot 70 and rails 50 to guide the slider 55 as the jewel case 10 is moved in or out of the storage position as shown in FIGS. 1 and 2.

Figures 5, 5A:
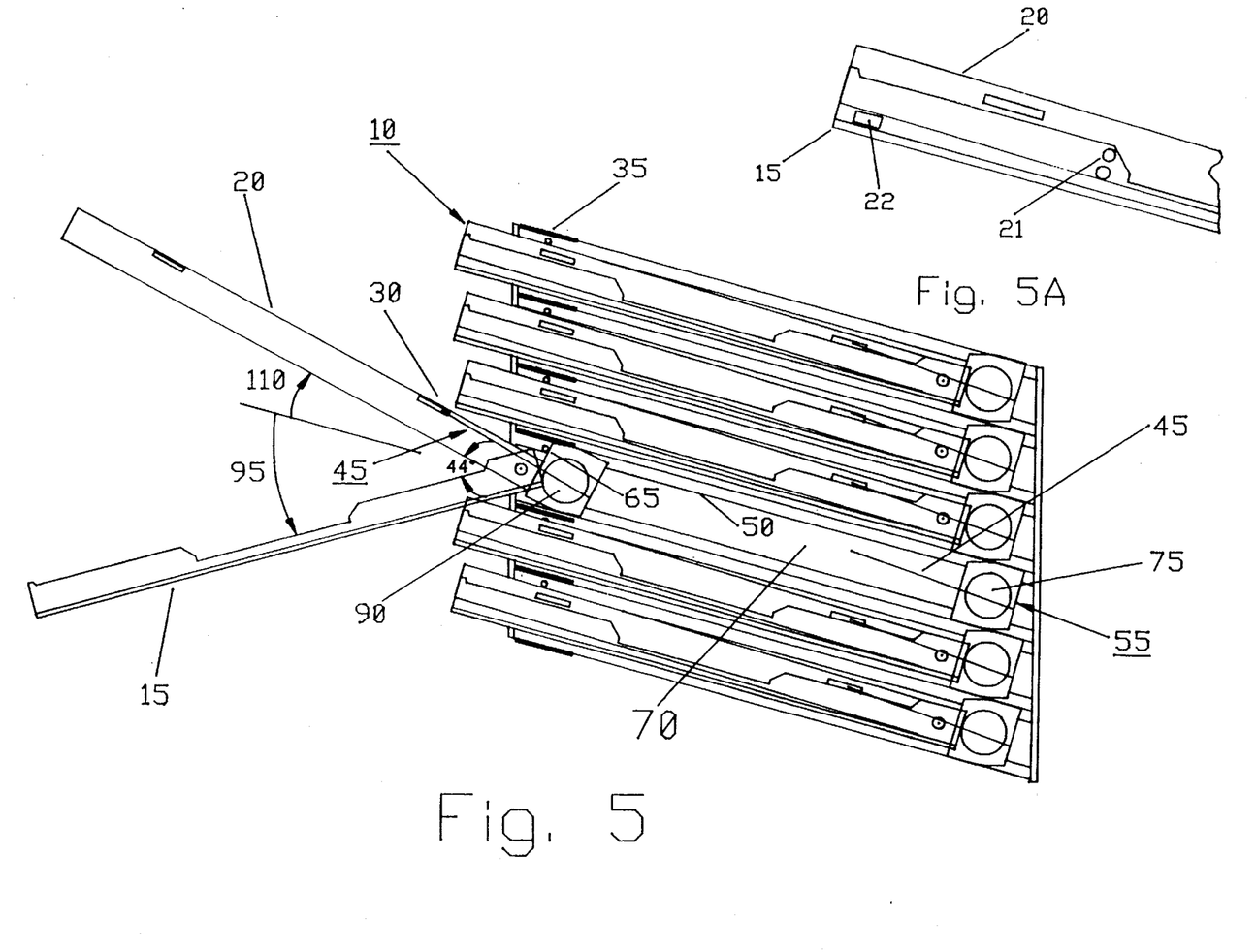
FIG. 5 is an side view showing several jewel cases in inclined storage positions defined by the separation and guide fins at the front of the storage position and showing the longitudinal guide slot with rails, and action of the cam slider assembly and linkage.
FIG. 5A shows the front section of a jewel case with closure bumper to keep the jewel case detent system from locking the unit when it is in the storage system.

FIG. 5 is a side view of one side wall with guide fins 35, guide slot 70, and guide rails 50. This preferred embodiment illustrates a concept with inclined storage of several jewel cases 10. Tilting the jewel case 10 to an angle of 15 degrees with respect to the horizontal as shown in FIG. 5, improves visibility for the user when reading identification legends. The concept shown functions well over a range of inclinations as long as the jewel case bottom 15 is able to rotate downward due to weight. One of the jewel cases 10, with linkage clip 45, actuation stop 65, and cam slider assembly 55 is shown in the withdrawn position 90 with the jewel case bottom 15 opened 95 and resting on the next lower jewel case 10 front. The jewel case cover 20 is shown in its final rotated position 110. Another cam slider assembly 55 is also shown in its normal non-rotated orientation 75 without the jewel case 10 connected. The guide slot 70 and guide rails 50 provide the guiding structure for the slider 55. In order to prevent the jewel case cover 20 from engaging the cover locking detents 24 and making it more difficult to open during removal from the storage position the jewel case 10 cover 20 is maintained in a slightly open position. Because of this the linkages 45 in FIG. 3 are shown slightly inclined with respect to the longitudinal slots 70. FIG. 5A shows an enlarged front section of a typical stored jewel case 10 configuration. The locations of the locking detent 24 on the cover 20 and the matching hole 23 in the bottom 15 are shown. Small self adhesive cover bumpers 22 that limit the closure of the cover 20 are shown placed between the front edges of the cover 20 and bottom 15 to prevent latching of the detents 24 and 23. The small bumpers 22 are necessary to prevent closure of the opened jewel case 10 that is directly below the one being removed. FIG. 5 shows that the bottom 15 rests on the partially opened cover of the next lower jewel case 10, supporting the weight of the jewel case bottom 15.

As shown in FIGS. 4 and 5, the location of the cam actuation stop 65 is selected to produce the desired rotation of the cam slider 55. The limitations of the system shown depend on compromises that consider the spacing between the jewel cases 10 and the extension allowed by the slider 55 and linkage assembly 45 as the jewel case 10 is withdrawn. As FIG. 5 shows, the slider 55 must allow the jewel case 10 to extend sufficiently permitting the jewel case bottom 15 to rotate downward, making contact with the upper edge of the next lower jewel case 10 while the rotating slider 55 raises the cover 20 contacting the lower edge of the next upper jewel case 10. The combination of both these movements creates the final total opening. If the jewel case 10 rear is withdraw further, control of the angle that the bottom 15 makes will be lost and the bottom 15 will fall to the vertical position and control of the orientation will be lost. The interaction of the variables described determines the final dimensional relationships which establishes the opening angle (95 and 110) that the jewel case 10 cover 20 and bottom 15 define.

Figure 6:
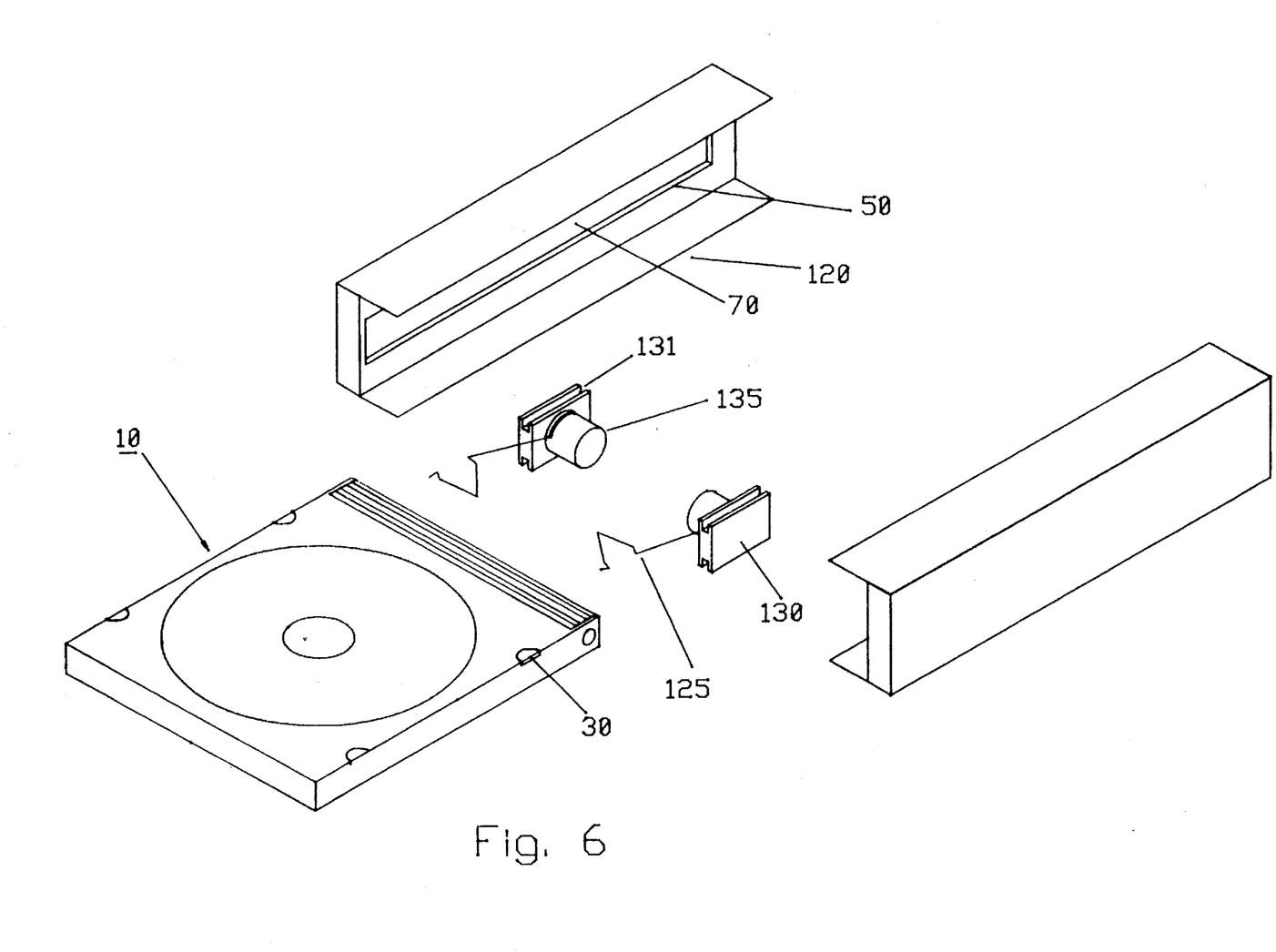
FIG. 6 is an isometric view of an alternate embodiment where a spring linkage clip is placed at a suitable angle to the longitudinal axis of the slider producing a fixed spring force sufficient to raise the jewel case cover.
Figures 7, 7A:
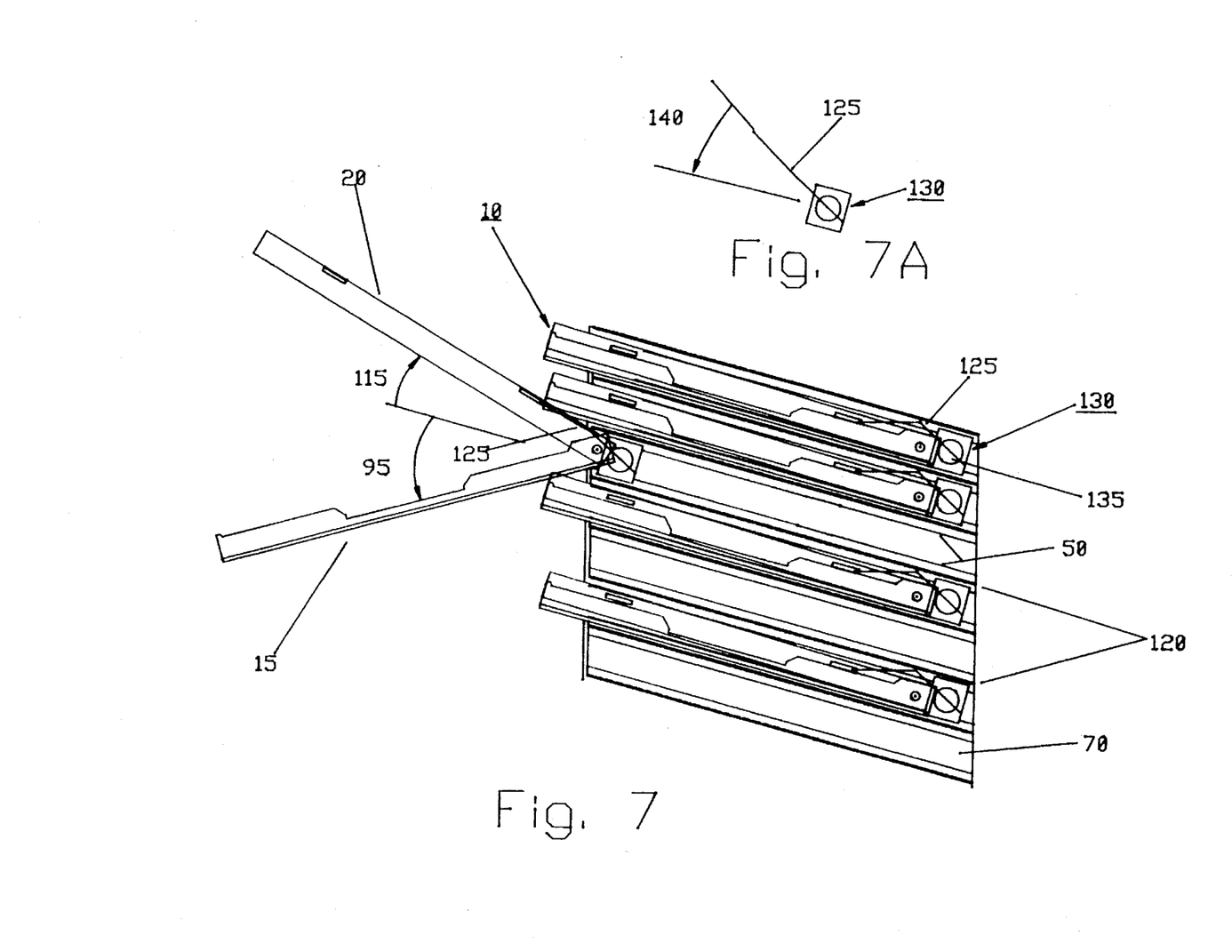
FIG. 7 is a side view showing several jewel cases placed in inclined storage positions equipped for the spring linkage clip slider assembly concept.
FIG. 7A detail view showing the angular alignment for the spring linkage clip to induce a spring bias for the jewel case cover lifting.

In the alternate concept shown in FIGS. 6 and 7, the operation is similar but the approach to provide the opening force for the jewel case cover 20 is distinctly different. Instead of the more rigid linkage described in the preferred embodiment, the linkage wire 125 becomes a spring element that is oriented and sized to provide sufficient force to hold the raised jewel case cover 20 when it is withdrawn. In this concept the opening force for the jewel case cover 20 is provided by a spring linkage clip 125 that is attached to the slider 130 rear stop 135 at a suitable angle to provide the desired spring opening force. The rear stop 135 is configured to retain the spring linkage clip 125 and prevent it from rotating about its longitudinal axis. The grooves 131 in the spring slider 130 engage corresponding rails 50 in the sidewall to guide the rectangular slider assembly 130 along the length of the guide slot 70 without rotation. Full length partial shelves 120 are provided to guide the jewel case assembly 10. The angle that the spring linkage element makes with the slider longitudinal movement axis 140 depends on the spring size and the force desired.

FIG. 7 shows how the alternate concept functions during the movement of jewel cases 10 in and out of the guide slots 70 with guide rails 50. An inclined configuration is preferred to facilitate ease of reading the descriptive information in the jewel case 10. FIG. 7A shows the relative orientation 140 of the slider with the spring linkage clip 125. When the spring clip 125 is engaged in the jewel case cover 20 slot 30, and cover 20 is closed, the spring slider assembly 130, provides a opening force 115 to open the jewel case cover 20 when the spring slider 125 reaches the forward limit of travel. The partial shelves 120 provide constraint for the spring loaded cover 20 and guidance for the jewel case as it is guided in and out of the slot. The slider 130 is guided between the pair of guide rails 50 maintaining the spring force developed during jewel case cover 20 closure while allowing the slider 130 to move back and forth in the guide slot 70. When the jewel case assembly 10 is withdrawn completely the bottom 15 falls 95 under the effect of gravity resting on the front edge of the next lower jewel case, while the cover 20 is raised 115 with the spring clip 125 until it contacts the lower front edge of the next upper stored jewel case assembly 10. To minimize the amount of friction developed as the closed jewel case 10 is moved in and out of the storage positions, the deflection and spring size are minimized. The primary disadvantage with the alternate configuration is the increased drag caused by the spring 125 preload on the jewel case cover 20 as the jewel case 10 and spring slider assembly 130 is moved in and out along the guide rails 50 and partial shelves 120.

Figure 8:
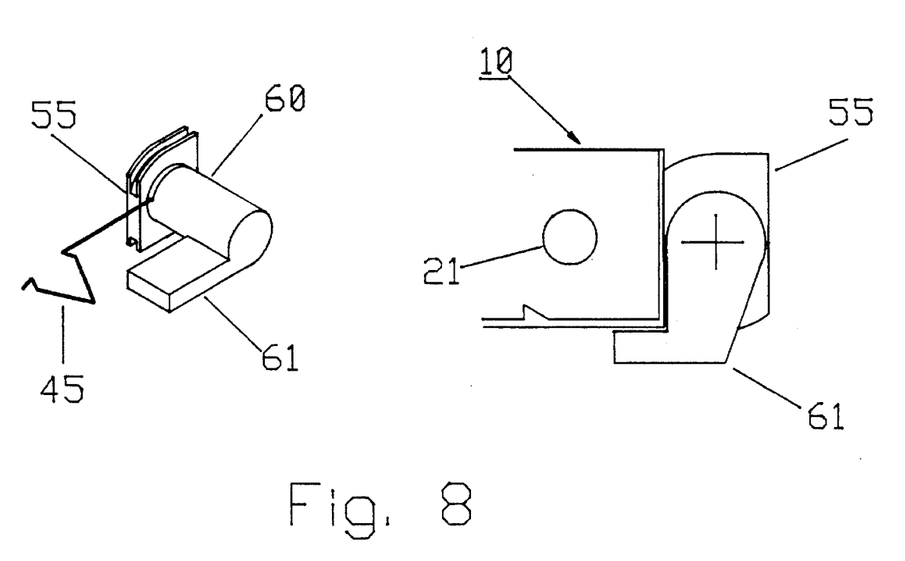
FIG. 8 illustrates a variation of the slider with extension to support the rear of the jewel case.

An optional configuration for the rear stop 60 is shown in FIG. 8. An extension 61 could be added, providing a small platform to support the lower rear edge of the jewel case bottom 20. The extension 61 is shown on a modified cam linkage slider 55 in order to enhance the guidance of the jewel case 10 during removal and installation. This approach might also benefit the alternate concept with the spring slider clip 125, allowing the use of the simplified sidewall concept utilized on the preferred embodiment with its short separation and guide fins 35 rather than the full length partial shelves 120.

SUMMARY, RAMIFICATIONS, AND SCOPE

After reviewing the description the reader will recognize that the simplified systems described represent a dramatic improvement in the art in terms of the simplification provided and is specifically intended to provide additional user benefits with a concept that is marketable from the standpoint of the added cost per storage position. The approach provides a CD listener with a low cost flexible approach to handling the jewel cases associated with compact disks. The scheme shown has resulted in a range of new capabilities and configurations not anticipated in prior art. The system can be incorporated into a number of vertical storage system concepts.

The flexibility of this concept allows it to be incorporated in a variety of configurations taking advantage of sidewall storage definition concepts that are already in the marketplace that provide a positive force to partially expel the jewel case the user has selected. This offers the potential to offer a hybrid storage concept where the jewel case fronts can be recessed to produce a smooth front.

While the descriptions contain much that is specific to the innovations described, these should not be construed as limitations on the scope of the invention, but rather as an exemplification of the primary embodiments described. Many variations are possible in determining the most cost effective design concept for manufacture.

I claim:

1. A storage system for jewel case compact disk enclosures providing storage, with retention of the jewel case enclosure, and automatic opening of a cover of the enclosure for removal and replacement of compact disk media contained therein, the jewel case enclosure having a bottom with cover hinged thereto, said system comprising:

a generally vertically oriented rectangular enclosure with sidewalls, containing separation and guide means comprising longitudinal elements providing location and orientation control for sliding means, and with lateral thin web projections defining a series of generally rectangular storage volumes for the jewel case compact disk enclosures, and a projection that contacts the sliding means at a point above centerline thereof as the sliding means nears an end of a forward range of longitudinal travel;

said sliding means comprising a modified circular element having upper and lower outer circular edges with a linear segment on front and rear edges, generally perpendicular to a longitudinal axis thereof, moving within said separation and guide means longitudinal elements, and with a lateral generally perpendicular projection into said storage volume, providing an attachment point for a linkage means, and with opposing flattened elements on the outer circular edges providing selective rotation about a central axis of said sliding means permitting upward rotation of said linkage means following contact with said separation and guide means projection while inhibiting rotation in a downward direction and said linkage means comprising a thin circular rod shaped element having a rear portion connected to said lateral projection of said sliding means in a manner to prevent rotation about the longitudinal axis, and extending forward to form a modified v shape projecting inward laterally into said storage volume, and engaging a rear slot provided on a cover of the jewel case enclosure, which, when said sliding means contacts said separation and guide means projection, causes said sliding means and attached linkage means to rotate raising the jewel case cover, whereby as the jewel case enclosure is withdrawn to a forwardmost position, the bottom rotates downward due to gravity and produces added tension on said jewel case cover and said linkage means producing rotation of said sliding means and attached cover upwards to an open position.

2. The elements of claim 1 where the separation and guide means are modified to include shortened lateral thin web projections located at entrance to the storage volumes.

3. The elements of claim 1 where the sliding means lateral projection and linkage means attachment structure is modified to include a projecting element extending from the sliding means and forming a surface against which the attached jewel case enclosure rests when said linkage means is engaged in said rear slot of the jewel case enclosure.

4. A simplified storage system for compact disk media and their jewel case enclosure, providing storage, with retention of the jewel case enclosure, and automatic opening of a cover of the jewel case enclosure, comprising:

a generally vertically oriented rectangular enclosure, with sidewalls containing separation and guide means comprising longitudinal elements providing location and orientation control for sliding means, and with lateral thin web projections defining a series of general rectangular storage volumes for the jewel case compact disk enclosures and;

said sliding means comprising a generally rectangular element, moving within said longitudinal elements comprising the separation and guide means, and with a lateral projection perpendicular to longitudinal path followed by said sliding means, intersected by and attached to a spring linkage means, and;

said spring linkage means comprising a thin circular rod shaped element with spring properties whose rear portion is connected with said lateral projection in a manner preventing rotation about a longitudinal axis of said linkage means and intersecting said laterally projecting part of said sliding means in a manner creating an angular deviation with respect to a longitudinal axis of the separation and guide means while extending forward and forming a modified v shape projecting inward laterally into said storage volume and engaging a rear slot provided on the jewel case enclosure cover, such that when the jewel case enclosure is deflected in a downward direction provides an upward force spring bias, whereby a spring opening bias is applied to the jewel case enclosure cover creating a cover opening force.

5. The elements of claim 4 where the sliding means lateral projection and linkage means attachment structure is modified to include a projecting element extending from the sliding means and forming a surface against which a lower rear edge of the attached jewel case enclosure rests when said linkage means is engaged in said rear slot of the jewel case to create a support for the rear of the jewel case enclosure reacting the tilting torsional load introduced on the jewel case enclosure by deformation of the spring linkage means.

6. The elements of claim 5 where the separation and guide means are modified to include shortened lateral thin web projections defining storage positions and located at an entrance to each of the storage volumes, whereby the sidewall separation and guide means configuration is simplified with short separation fins surrounding the entrances to the storage volumes.

7. A storage system for compact disk jewel cases, the jewel cases each having a bottom member and a cover hinged to the bottom member adjacent a rear edge of the bottom member, each cover having at least one slot on each side edge spaced forwardly from the rear edge of the bottom member, said storage system comprising:

- a rectangular enclosure having a pair of generally vertically oriented spaced sidewalls interconnected by generally horizontally oriented top and bottom members, and a plurality of uniformly arranged, parallel guide rails coupled to said sidewalls and extending generally parallel to said top and bottom members;
- a plurality of cam slider assemblies each adapted for sliding engagement with a respective one of said guide rails, each of said slide assemblies including a projection extending generally normal to said sidewalls and adapted for abutting the rear edge of a jewel case inserted into said enclosure in alignment with a pair of said slide assemblies;
- a plurality of spring linkage clips each having one end attached to a corresponding one of said slider assemblies and a second end adapted for insertion into the at least one slot in the jewel case cover for coupling the jewel case to said slider assemblies; and said spring linkage clips providing a biasing force for opening the cover of the associated jewel case when the jewel case is pulled to a forward-most position, the bottom member of the jewel case pivoting downward under its own mass.

8. The storage system of claim 7 and including:

- a plurality of cam actuation stops on said sidewalls, each stop being positioned adjacent a front edge of one of said guide rails in a location for engaging an upper edge of a corresponding one of said slider assemblies when said slider assemblies are moved to a forward most position; and
- each of said slider assemblies being adapted for rotating in a direction to elevate said second end of an associated one of said spring linkage clips when said slider assemblies are forced forward against said cam actuation stops to thereby raise the jewel case cover coupled to said linkage clips as the jewel case is pulled outward of said enclosure.

* * * * *